United States Patent
Gump

[15] 3,678,049
[45] July 18, 1972

[54] POLYMERIZATION OF AROMATIC NITRILES IN 2-PYRROLIDINONE AS SOLVENT AND CATALYST AT ELEVATED TEMPERATURES

[72] Inventor: Klaus H. Gump, Gillette, N.J.
[73] Assignee: Celanese Corporation, New York, N.Y.
[22] Filed: Dec. 8, 1970
[21] Appl. No.: 96,232

[52] U.S. Cl.....................................260/248 CS, 260/2 R
[51] Int. Cl. .............................................C07d 55/12
[58] Field of Search..................250/248 CS, 2 R, 78.4 N

[56] References Cited

UNITED STATES PATENTS 3,057,808   10/1962   Fierce et al..............................260/248
3,317,484   5/1967   Fritz et al................................260/78.4

*Primary Examiner*—John M. Ford
*Attorney*—J. A. Shedden, Thomas J. Morgan, C. B. Barris and K. E. Macklin

[57] ABSTRACT

Aromatic nitriles, such as benzonitrile, are temperature-selectively polymerized in 2-pyrrolidinone at temperatures above 200°C. At temperatures between about 200° to 350°C. trimerization to a cyclic substituted 1,3,5-triazine occurs. At temperatures above 300°C., imidization occurs, producing a black, non-melting linear poly-(aryl)-carbimide which is soluble only in strong acids and is thermogravimetrically stable up to 600°C. At 300°–350°C., mixtures of trimers and polymeric imides are produced and are separable by sublimation or extraction with aromatic hydrocarbons.

13 Claims, No Drawings

POLYMERIZATION OF AROMATIC NITRILES IN 2-PYRROLIDINONE AS SOLVENT AND CATALYST AT ELEVATED TEMPERATURES

BACKGROUND OF THE INVENTION

1. Field of the Invention

This invention relates to the polymerization of aromatic nitriles in the presence of a novel solvent catalyst system. More particularly, the invention relates to the temperature-selective trimerization and/or imidization of aromatic nitriles in 2-pyrrolidinone as the solvent and complete catalyst therefor.

2. Description of the Prior Art

The preparation of 1,3,5-triazines from aromatic mononitriles is known, an example being the preparation of 2,4,6 triphenyl triazine from benzonitrile. This trimerization reaction can be effected by various catalyst systems, including amides and hydrides of alkali metals and alkaline earth metals, sulfuric acid, zinc diethyl, bromine, metallic sodium, and aluminum chloride. However, these reactions are difficult to control and create impurities in the product which are not easily removed. Moreover, a polymerization reaction of imidization type which could lead to formation of a useful polymer is not easily achieved with these known reactions.

SUMMARY OF THE INVENTION

It is the object of this invention to provide a simple and easily controllable process for preparation of 1,3,5-triazines from aromatic nitriles in a solvent-catalyst system which introduces no impurities in the product.

It is another object of this invention to provide a process for polymerizing aromatic nitriles into useful polymers by means of a single solvent catalyst system.

DESCRIPTION OF THE INVENTION

In accordance with these objectives, it has been found that the trimerization of aromatic nitriles, such as benzonitrile, and ortho-, meta-, and para-phthalonitriles can be readily and smoothly achieved with 2-pyrrolidinone as the solvent catalyst. This catalyst is inactive at low temperatures, but it is exceedingly effective at elevated temperatures and simultaneously acts as a solvent during the reaction. No impurity need be added for catalytic effects.

The trimeric compounds produced by this solvent-catalyzed trimerization are represented by the formula:

I.

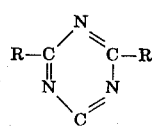

wherein R comprises benzene; the alkyl-, hydroxy-, amino-, nitro-, and halo-benzenes; naphthalenes; cyano-benzenes; and cyano-naphthalenes as well as substituted cyano-pyridines; furanes; and thiophenes.

These trimers are readily prepared by heating a solution of the aromatic nitrile in 2-pyrrolidinone at temperatures ranging between 200° and 350°C. The products can be isolated by simple filtration of the solution after reaction and cooling. Alternatively, the reaction products can be isolated and purified by other known principles including sublimation and extraction with organic solvents, such as aromatic hydrocarbons.

It has further been found that heating the same solution of an aromatic nitrile in 2-pyrrolidinone at temperatures of 300°C. and above results in poly-(aryl) carbimides. At temperatures of 300°-350°C., mixtures of the trimeric and the polymeric compounds are obtained. These polymeric imides are of the formula:

II.

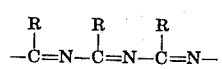

wherein R comprises the radical groups of formula I.

The catalyst in this imidization reaction is 2-pyrrolidinone alone; no additional catalyst need be added. The reaction products can be isolated by dissolving the polymer in sulfuric acid and precipitating it in water.

The 2-pyrrolidinone solution with which to prepare the trimers or poly-(aryl) carbimides of the instant invention can contain from about 0.5 weight percent to about the maximum unit of the solubility of the monomer in the solvent-catalyst; however, the preferred range is from about 5 to about 25 weight percent.

Generally, the reaction time for either trimerization or imidization varies from one-half hour to 24 hours for complete conversion of a nitrile into the triazine or the poly-(aryl) carbimide. The reactions are conveniently carried out in an inert atmosphere and initiated under reduced pressure because the reaction temperature is above the boiling point of the catalyst-solvent, but use of superatmospheric pressure is preferred.

The structure of the triazines was confirmed by elemental analysis thereof; by melting point determination; and by infrared spectra. These trimers are soluble in organic solvents, e.g., aromatic hydrocarbons.

The linear polymers are black, non-melting, and soluble in strong acids, such as concentrated sulfuric acid. Intrinsic viscosities, which were determined in concentrated $H_2SO_4$, showed values of up to 0.28 dl/g. Their thermal stability, as determined by thermogravimetric analysis, was very good. The weight-loss profiles (15°C/minute) in air and in nitrogen were identical and showed thermal stability up to a temperature of 600°C. Above this temperature, a gradual weight weight loss commenced in both gaseous media.

The following examples illustrate the temperature-selectivity of this invention for polymerizing aromatic nitriles in 2-pyrrolidinone as solvent-catalyst at temperatures above 200°C.

EXAMPLE 1

A glass-lined rocking autoclave, containing 50 grams of benzonitrile dissolved in 250 grams of 2-pyrrolidinone, was evacuated to 0.001 mm Hg and heated to 285°C. for 8 hours. After cooling to approximately room temperature, 20.5 grams of a crystalline material were isolated by filtration. This yield corresponds to a 41 percent conversion. After re-crystallization in benzene, the crystalline product had a melting point of 233–234°2,4,6-triphenyl-1,3,5-triazine $(C_7H_5N)_3$. The calculated percentages of the component elements are: C—81.49, H—4.88, and N—13.58. The analytically determined percentages were: C—81.36, H—4.83, and N—13.50.

EXAMPLE 2

The reaction of Example 1 was repeated at a temperature of 325°C. for 8 hours. After cooling to approximately room temperature, 35 grams of a crude product were obtained. By boiling in benzene, 22 grams of the triazine were separated from 13 grams of a black polymer which was characterized as poly-(phenyl)-carbimide. The calculated percentages of its component elements are: C—81.49, H—4.88, and N—13.58. The analytically determined percentages were: C—81.53, H—4.81, and N—13.29. The relative viscosity, determined by a 0.1 percent sulfuric acid solution at 25°C., was 0.22 dl/g.

EXAMPLE 3

The reaction of Example 1 was repeated at a temperature of 400°C. for 4 hours. After cooling to approximately room temperature, 35 grams of substantially pure poly-(phenyl)-carbimide were isolated. This corresponds to a 70 percent conversion.

EXAMPLE 4

Using a glass-lined rocking autoclave, 50 grams of meta-phthalonitrile were dissolved in 250 grams of 2-pyrrolidinone. After evacuation to 0.001 mm Hg, the autoclave was heated to 285°C. for 24 hours. After cooling to approximately room temperature, 23 grams of a product believed to be 2,4,6-tris-(metacyanophenyl)-1,3,5-triazine were isolated. This yield corresponds to a 46 percent conversion. The calculated percentages of the component elements in the empirical formula, $(C_8H_4N)_3$, are: C—74.99, H-3.15, and N—21.86. The analytically determined percentages were: C—74.89, H-3.09, and N—21.76.

EXAMPLE 5

The reaction of Example 4 was repeated at a temperature of 400°C. for 4 hours. After cooling to approximately room temperature, 41 grams of a product believed to be poly (metacyanophenyl)-carbimide $(C_8H_4N_2)_n$ were isolated. This corresponds to an 82 percent conversion. The calculated percentages of the component elements are: C—74.99, H—3.15, and N—21.86. The analytically determined percentages were: C—74.99, H—3.03, and N—21.10. The relative viscosity, as determined by a 0.1 percent sulfuric acid solution at 25°C., was 0.28 dl/g.

EXAMPLE 6

Using a glass-lined rocking autoclave containing 250 grams of 2-pyrrolidinone, 50 grams of para-phthalonitrile were dissolved therein. After evacuating the autoclave to 0.001 mm Hg, the reactor was heated to 285°C. for 24 hours. After cooling to approximately room temperature, 27 grams of a trimer believed to be 2,4,6-tris(para-cyanophenyl)-1,3,5-triazine $(C_8H_4N)_3$ were isolated. This corresponds to a 50 percent conversion. The calculated percentages for the component elements are: C—74.99, H—3.15, and N—21.86. The analytically determined percentages were: C—74.93, H—3.08, and N—21.46.

EXAMPLE 7

The reaction of Example 6 was repeated at a temperature of 400°C. After a reaction period of 24 hours, the contents of the reactor were cooled to approximately room temperature and 38 grams of poly-(para-cyanophenyl)-carbimide were isolated. This corresponds to a conversion of 76 percent. The elemental analysis was $(C_8H_4N_2)_n$. The calculated percentages for the component elements are: C—74.99, H—3.15, and N—21.86. The analytically determined percentages for the same elements were: C—74.89, H—3.01, and N—21.17. The relative viscosity, determined by a 0.1 percent sulfuric acid solution at 25°C. was 0.23 dl/g.

The polycarbimides of this invention form low-cost, high-performance polymers which have many potential uses, based upon their exceptional thermal stability at high temperatures. Illustrative of the utility of this material is its use as a high temperature filter, wire coating; protective cloth; and industrial sewing thread; in addition to composites applications such as in laminates and/or adhesives. The processes of this invention for making both trimers and polymeric imides as described hereinbefore and illustrated with specific embodiments are intended to be defined and protected by the following claims.

What is claimed is:

1. A temperature-selective process for polymerizing aromatic nitriles in 2-pyrrolidinone as solvent and as catalyst at temperatures above 200°C.

2. The process of claim 1 in which said temperature is maintained for at least one-half hour.

3. The process of claim 2 in which 1,3,5-triazines are produced at temperatures of 200°–350°C.

4. The process of claim 3 in which said 1,3,5-triazines are separated from the reaction mixture by cooling and filtering.

5. The process of claim 2 in which polycarbimides are produced at temperatures above 300°C.

6. The process of claim 5 in which said polycarbimides are soluble in concentrated sulfuric acid.

7. The process of claim 6 in which said polycarbimides are precipitated by adding the sulfuric acid solution to water.

8. The process of claim 2 in which a mixture of 1,3,5-triazine and polycarbimides is produced at temperatures of 300°–350°C.

9. The process of claim 8 in which said mixture is separated, after cooling and filtering the reaction product, by treatment with an aromatic solvent.

10. The process of claim 8 in which said mixture is separated, after cooling and filtering the reaction product, by treatment with a concentrated acid, filtering, and adding the acid solution to water.

11. The process of claim 5 in which said polycarbimides are purified, after cooling and filtering the reaction product, by treatment with a concentrated acid, filtering, and adding the acid solution to water.

12. The polycarbimides produced by the process of claim 10.

13. The polycarbimides produced by the process of claim 11.

* * * * *

PO-1050
(5/69)

Docket 4931

UNITED STATES PATENT OFFICE
CERTIFICATE OF CORRECTION

Patent No. 3,678,049           Dated July 18, 1972

Inventor(s) KLAUS H. GUMP

It is certified that error appears in the above-identified patent and that said Letters Patent are hereby corrected as shown below:

In column 2, line 45, after "233-234°" insert --C. and was identified as --

In column 3, line 6, delete "$(C_8H_4N^2)_3$" and insert -- $(C_8H_4N_2)_3$ --

In column 3, line 30, delete "$(C_8H_4N^2)_3$" and insert -- $(C_8H_4N_2)_3$ --

Signed and sealed this 2nd day of January 1973.

(SEAL)
Attest:

EDWARD M. FLETCHER, JR.
Attesting Officer

ROBERT GOTTSCHALK
Commissioner of Patents